United States Patent
Ito et al.

(10) Patent No.: US 7,716,027 B2
(45) Date of Patent: May 11, 2010

(54) SIMULATION CONDITION INPUT APPARATUS, COMPUTER READABLE MEDIUM, SIMULATION CONDITION INPUT METHOD AND COMPUTER DATA SIGNAL

(75) Inventors: Tomoyuki Ito, Kanagawa (JP); Kazuki Inami, Kanagawa (JP); Hirokazu Mukai, Kanagawa (JP); Hideki Okamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 688 days.

(21) Appl. No.: 11/599,256

(22) Filed: Nov. 15, 2006

(65) Prior Publication Data
US 2007/0282580 A1     Dec. 6, 2007

(30) Foreign Application Priority Data
Jun. 6, 2006     (JP)     ............................ P2006-156929

(51) Int. Cl.
*G06F 7/48*     (2006.01)
(52) U.S. Cl. ............................. 703/7; 700/112; 700/228
(58) Field of Classification Search ................ 703/6, 703/7, 13, 22; 700/112–114, 228–230
See application file for complete search history.

(56) References Cited

U.S. PATENT DOCUMENTS 6,950,787 B2 *   9/2005   Hashima et al. ................ 703/2
2006/0129364 A1 *   6/2006   Ikegami et al. ................ 703/6

FOREIGN PATENT DOCUMENTS

JP     2000-331037     11/2000

* cited by examiner

*Primary Examiner*—Russell Frejd
(74) *Attorney, Agent, or Firm*—Morgan, Lewis & Bockius LLP

(57) ABSTRACT

A simulation condition input apparatus inputs information required for simulation analysis on a system including plural element members. The apparatus includes a display unit, a specifying unit and an input unit. The display unit displays the plural element members on a screen with geometrical shapes corresponding to the element members. The specifying unit specifies a contact portion between at least one set of the element members, which is an information input target, on the screen of the display unit. The input unit displays a new window screen and inputs information about a contact state of the contact portion specified by the specifying unit.

11 Claims, 3 Drawing Sheets

SIMULATION CONDITION INPUT APPARATUS, COMPUTER READABLE MEDIUM, SIMULATION CONDITION INPUT METHOD AND COMPUTER DATA SIGNAL

BACKGROUND

Technical Field

This invention relates to a simulation condition input apparatus, a computer readable medium storing a simulation condition input program, and a simulation condition input method for inputting information required for simulation analysis to a simulation apparatus for executing the simulation analysis.

SUMMARY

According to an aspect of the invention, a simulation condition input apparatus inputs information required for simulation analysis on a system including plural element members. The apparatus includes a display unit, a specifying unit and an input unit. The display unit displays the plural element members on a screen with geometrical shapes corresponding to the element members. The specifying unit specifies a contact portion between at least one set of the element members, which is an information input target, on the screen of the display unit. The input unit displays a new window screen and inputs information about a contact state of the contact portion specified by the specifying unit.

BRIEF DESCRIPTION OF THE DRAWINGS

Exemplary embodiments of the invention will be described below in detail with reference to accompanying drawings wherein.

DETAILED DESCRIPTION

A simulation condition input apparatus, a computer readable medium storing a simulation condition input program, and a simulation condition input method according to an exemplary embodiment of the invention will be described based on the accompanying drawings.

Figure 1:
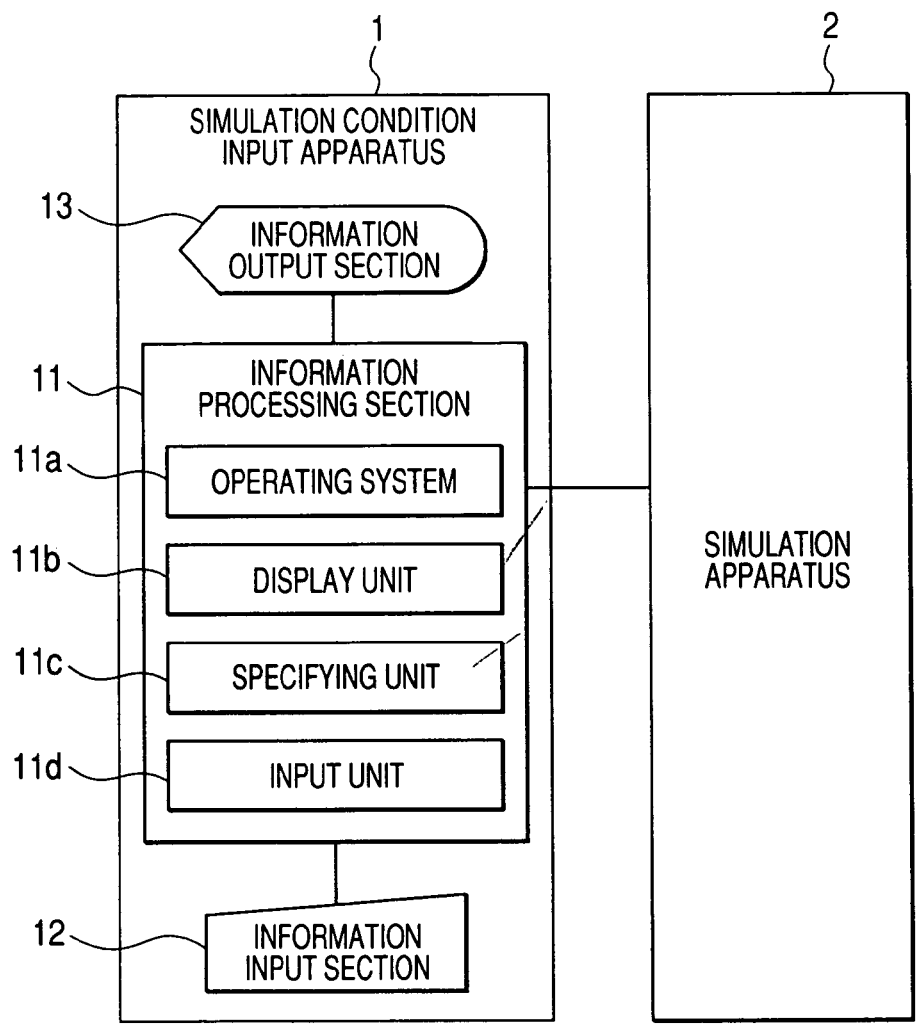
FIG. 1 is a block diagram to show a schematic configuration example of a simulation condition input apparatus according to an exemplary embodiment of the invention.

To begin with, the schematic configuration of the simulation condition input apparatus 1 will be described. FIG. 1 is a block diagram to show the schematic configuration example of a simulation condition input apparatus 1 according to the exemplary embodiment of the invention.

The simulation condition input apparatus 1 inputs information required for simulation analysis to a simulation apparatus 2, which executes the simulation analysis. The simulation condition input apparatus 1 is connected to the simulation apparatus 2 for use. However, it is not necessary that the simulation condition input apparatus 1 is a separate body from the simulation apparatus 2. The simulation condition input apparatus 1 may be integrated with the simulation apparatus 2. That is, the simulation apparatus 2 may have a function of the simulation condition input apparatus 1.

The simulation apparatus 2 executes simulation analysis of thermal analysis and discharge analysis on a paper transport system, which includes element members such as rollers and belts. The details of the simulation analysis and the apparatus configuration for executing the simulation analysis may be implemented using publicly known technologies and therefore will not be described again here.

In order to input information to the simulation apparatus 2, the simulation condition input apparatus 1 includes an information processing section 11, an information input section 12 and an information output section 13. The information processing section 11 has a function of a computer, which is implemented by a combination of a CPU (Central Processing Unit) and RAM (Random Access Memory). The information input section 12 includes a keyboard and a mouse and inputs information to the simulation apparatus 2. The information output section 13 includes a display and outputs information processed by the information processing section 11 and information input from the information input section 12 to the user of the simulation condition input apparatus 1. Further, the information processing section 11 includes an operating system 11a, a display unit 11b, a specifying unit 11c, and an input unit 11d.

The operating system 11a performs operation control of the whole simulation condition input apparatus 1. GUI (Graphical User Interface) control can be named as an example of the operation control.

When information is input to the simulation apparatus 2, the display unit 11b displays the element members such as the rollers and the belts, which makes up the transport system, on a screen with geometrical shapes such as circles and rectangles, which correspond to the element members. Displaying on the screen is performed using the information output section 13. The geometrical shapes displayed on the screen may be any shapes so long as the geometrical shapes correspond to the element members. Therefore, it is not necessary that the shapes of the element members and the geometrical shapes are the same so long as the shapes of the element members and the geometrical shapes uniquely correspond to each other. Specifically, the geometrical shapes may be displayed so as to have the same shapes of the element members. Also, the geometrical shapes of the element members may be changed so as to display the element members separately from each other in the contact portion between the element members. Also, the geometrical shapes of the element members may be changed so as to enlarge or reduce the geometrical shape of the element members as described later. Also, the geometrical shapes of the element members may be changed so as to display the geometrical shape of the element members uniformly with a geometrical shape, which is expanded in accordance with a predetermined rule, as described later. Here "uniformly" contains not only the case where the geometrical shapes of all element members are made uniform, but also the case where the geometrical shapes of other element members except the geometrical shapes of some element members are made uniform, namely, the case where some exceptional geometrical shapes exist.

The specifying unit 11c specifies the contact portion between the element members as an information input target on the screen, which the display unit 11b causes the information output section 13 to output. To specify the contact portion, the user of the simulation condition input apparatus 1 may be requested to operate the information input section 12. Specifically, the user may move a cursor displayed on the screen of the information output section 13 through the information input section 12. When the user moves the cursor to any desired contact portion, the user can be allowed to perform predetermined operation (double click) in the information input section 12, to thereby specify the contact portion.

The input unit 11d displays a window screen for inputting information about the contact portion specified by the specifying unit 11c on the screen of the information output section 13. The input unit 11d allows the user to input information using the window screen by operating the information input section 12. The input information is adopted as information about the contact state between the element members in the contact portion specified by the specifying unit 11c. Examples of the information about the contact state may include information about a size of the contact portion, information about a thermal resistance of the contact portion and information about an electric resistance of the contact portion. However, what information is adopted as the information about the contact state may be set appropriately in response to the simulation analysis executed by the simulation apparatus 2 and is not limited. The window screen may be displayed at least when information is input. The window screen may be displayed just before information is input or may be displayed at all times after the apparatus is activated.

The computer function of the information processing section 11 may executes a predetermined program to implement the operating system 11a, the display unit 11b, the specifying unit 11c and the input unit 11d of the information processing section 11. In this case, the predetermined program may be provided in such a manner that the predetermined program is stored on a computer-readable storage medium or may be distributed through wired or wireless communication means before the program is installed in the information processing section 11 or storage that can be accessed by the information processing section 11. That is, the simulation condition input apparatus 1 of this exemplary embodiment can also be implemented by a simulation condition input program that can be installed in the information processing section 11 of the simulation condition input apparatus 1 or in a storage device that can be accessed by the information processing section 11.

Next, a processing operation example for inputting information to the simulation apparatus 2 using the simulation condition input apparatus 1 (containing the case where it is implemented as the simulation condition input program), that is, the procedure of the simulation condition input method according to the exemplary embodiment of the invention will be described by taking a specific example.

Figure 2:
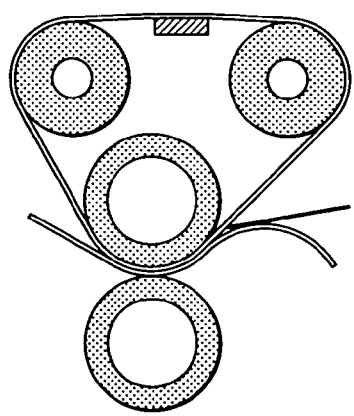
FIG. 2 is a schematic representation to show a specific example of a transport system.

FIG. 2 is a schematic representation to show a specific example of a transport system. Here, the case where input is information required for simulation of thermal analysis and discharge analysis on a transport system including element members such as plural rollers, a belt wound on the rollers and a blade abutting against the belt as shown in FIG. 2 is taken as an example. Here, for simplicity of the description, the transport system in a two-dimensional space is taken as an example and the depth direction in FIG. 2 (roller shaft direction) is ignored in the description. However, the invention can also be applied to the transport system in a three-dimensional space, which considers the depth direction, of course.

When simulation analysis, which treats contact between element members, such as thermal analysis or discharge analysis is executed on such a transport system, the effects of belt rigidity, electrostatic force and adhesion force exist. Therefore, it is not sufficient to merely specify a positional relationship between the element members and presence/absence of contact between the element members is insufficient. Information about the contact state such as a size of the contact portion, a thermal resistance of the contact portion and an electric resistance of the contact portion are required as parameters. On the other hand, actual shapes of the element members and arrangement of the element member are not much important.

Figure 3A:
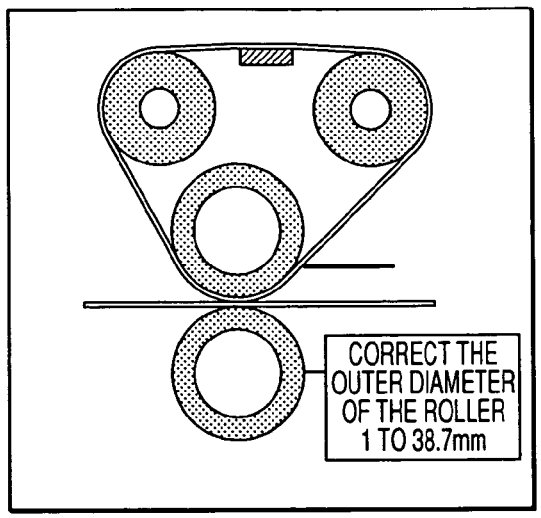
FIG. 3 is a schematic representation to show a specific example of a display screen produced by the simulation condition input apparatus according to the exemplary embodiment of the invention.
Figure 3B:
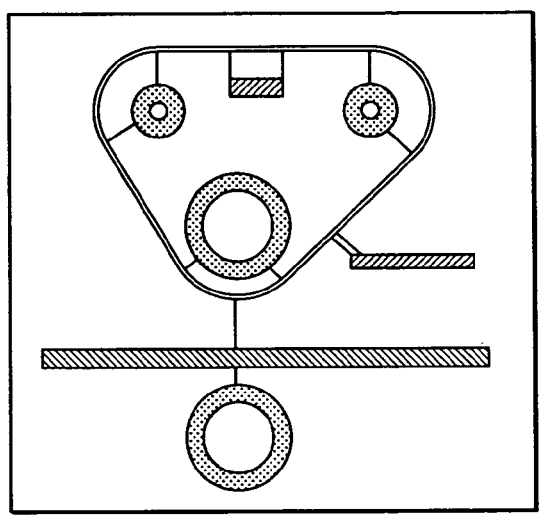
Figure 3C:
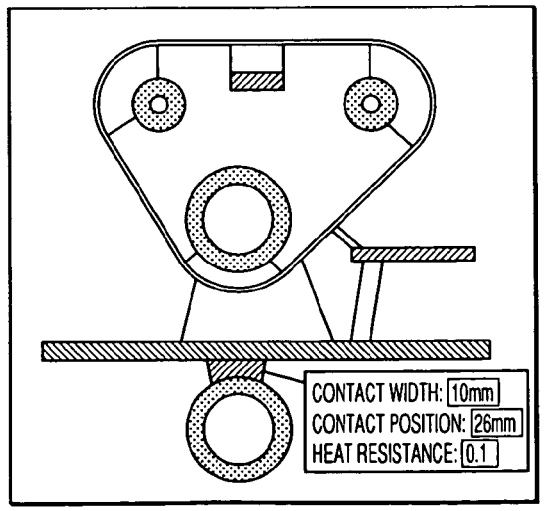

Thus, the simulation condition input apparatus 1 requests the user to input parameters for simulation analysis according to the procedure described below. FIG. 3 is a schematic representation to show a specific display example of the screen produced by the simulation condition input apparatus 1.

In the simulation condition input apparatus 1, first the display unit 11b displays the element members forming the transport system, on which simulation analysis is to be executed, on the screen using the information output section 13. Accordingly, the element members forming the transport system are displayed to have roughly the same geometrical shapes and positional relationship from the information output section 13, as shown in FIG. 3(a).

At this time, it is conceivable that the screen may be displayed as follows. That is, the user operating the information input section 12 is requested to input information about center coordinates of each roller, a belt wounding (placement) relationship and presence/absence of contact without considering the complicated contact state such as the action force and deformation. Then, displaying is made on the screen based on the input information, using the publicly known graphic creation technology, image processing technology and GUI technology. If CAD (Computer Aided Design) data about the transport system exists, displaying may be made on the screen based on the CAD data.

If displaying is thus made on the screen, that is, if the shapes, the sizes, and the positions of the element members making up the transport system are determined, the contact position between the element members, the contact mode (point contact or line contact if a two-dimensional space is adopted) and the size of the contact portion (which may be hereinafter referred to simply as "contact width" because of two-dimensional space) can be calculated based on the already determined information. This means that the simulation condition input apparatus 1 can automatically calculate them. However, the user may input them using the information input section 12 like the already determined information.

If a contradiction arises in the already determined information, the simulation condition input apparatus 1 may automatically make a correction so as to resolve the contradiction. Specifically, if a contradiction arises in any of the shape, the size, or the position of each element member therefrom, it is possible to add a correction such that "the outer diameter of roller 1 has been corrected to 38.77 mm" as shown in the figure, for example, following a preset rule.

The information correction is not limited to the case where a contradiction arises between information pieces, and may be made as required. For example, if a contradiction does not arise between information pieces, it is also possible to make an automatic correction so that the surface lengths or the peripheral lengths of the element members in contact with each other become a predetermined relationship (for example, an integral multiple of a constant number). If such a correction is made, when the simulation apparatus 2 conducts simulation analysis, consistency of the analysis results on the element members can be ensured very easily, resulting in contributing to improvement of the analysis accuracy of the simulation.

Such information correction also becomes effective in the following points: For example, to input information about the element members in contact with each other, a restriction on the information input may occur because of simulation involving contact. Avoiding interference between the element members can be named as the restriction. In addition, if it becomes important to place lattice points for calculation placed on the element surface with the same spacing in the mutual contact portion to provide consistency of analysis, ensuring that the information input satisfies the restriction about the placement spacing becomes effective for providing consistency of analysis. The restriction of the interference avoidance can be met by lessening the roller diameter, for example. This also leads to resolving the "contradiction" described above. On the other hand, if a correction is made to the geometrical shapes of the element members in contact with each other so that the surface lengths or the peripheral lengths of the element members become each an integral multiple of a constant value regardless of the presence or absence of contradiction, it can be ensured that the lattice points for calculation placed on the element surface are placed with the same spacing in the mutual contact portion. Therefore, it becomes effective for providing consistency of analysis on the element members.

After the screen display about the transport system is thus produced, subsequently the simulation condition input apparatus 1 requests the user to input parameters using the screen display. At this time, however, if the element members of the transport system are displayed on the screen as roughly the same geometrical shapes and positional relationship as the element members, it cannot necessarily be said that the user can easily input parameters.

Then, when parameters are input, the display unit 11b of the simulation condition input apparatus 1 changes the geometrical shapes of the element members. Specifically, when the user performs predetermined operation through the information input section 12 after displaying is made on the screen as described above, the display unit 11b changes the geometrical shapes of the element members with the predetermined operation as a trigger so that the element members in the contact portion between the element members is displayed to be separate from each other as shown in FIG. 3(b). More particularly, the geometrical shapes of the rollers on which the belt is wound are reduced to bring the rollers away from the contact portion with the belt. A sheet-like medium is reduced in the thickness direction so that the surface and the back of the sheet-like medium can be identified. With regard to a nip portion between the belts and a nip portion between the belt and the blade, the displayed positions are moved so as to bring the mutual contact portions away from each other.

That is, the display unit 11b changes the element members making up the transport system so as to become geometrical shapes different from the actual geometrical shapes while corresponding to the actual geometrical shapes of the element members. Also, the display unit 11b causes the information output section 13 to display the changed geometrical shapes. Accordingly, from the information output section 13, the element members making up the transport system are displayed so as to have the geometrical shapes and the positional relationship, which uniquely correspond to the original, although they are not necessarily the same shapes. For each contact portion between the element members, the element members are displayed in a state where they are placed away from each other. Portions having the contact relationship are displayed in a visible form with dashed lines based on information concerning the contact width already determined.

At this time, it is assumed that the change degree of the geometrical shapes executed by the display unit 11b (the reduction ratio and the move distance of each geometrical shape) is preset so as to have the unique correspondence with the original geometrical shapes. The technique of changing the geometrical shapes may use the publicly known graphic data processing technology, etc., and therefore will not be described again here.

Then, the specifying unit 11c specifies the contact portion between the element members as the information input target on the displayed screen of the information output section 13 by the display unit 11b. Specifically, the user moves a cursor displayed on the screen on the information output section 13 by operating the information input section 12. When the user performs predetermined operation (e.g. double click) at any desired contact portion, the specifying unit 11c determines that the contact portion pointed by the cursor is the contact portion between the element members, which serves as the information input target.

When the specifying unit 11c specifies the contact portion, the display unit 11b changes the display mode of the specified contact portion so that the specified contact portion can be distinguished from any other contact portion between the element members. Specifically, an area portion indicating the contact relationship between the element members, that is, the area portion surrounded by the contact surface between the element members, dashed line is displayed with a different display color, that is, is displayed with a particular color. If the area portion is thus displayed with the particular color, it is made possible to easily recognize the contact portion, which is specified as the information input target. At this time, the element members involved in the contact relationship may also be displayed with the particular color in addition to displaying of the area portion indicating the contact relationship with the particular color. Thereby, it is made possible to easily recognize which element members have the contact relationship.

Further, when the specifying unit 11c specifies the contact portion, the input unit 11d generates a window screen for inputting information about the contact portion. The display unit 11b displays the window screen on the screen of the information output section 13. The window screen displayed at this time allows the user to input information about the contact state of the specified contact portion (e.g. contact width and thermal resistance) by operating the information input section 12. This means that the user operating the information input section 12 can use the window screen to input the information about the contact state such as the contact width and the thermal resistance. The window screen may be generated using the publicly known GUI technology and therefore this topic will not be described in detail again here. The display position of the window screen may be determined appropriately using the publicly known GUI technology. Further, the window screen may enable the user to add a new contact portion or delete any already existing contact portion as well as to input the information about the contact state.

Further, not only in the case where change display of the geometrical shapes is produced, but also in the case where change display of the geometrical shapes is not produced, if the display mode of the specified contact portion is changed to highlighting, for example, so that the specified contact portion can be distinguished from any other contact portion between the element members than the specified contact portion as described in the embodiment, it is made possible for the user to grasp the contact relationship between the element members, so that convenience for the user is also enhanced in this point. Change in the display mode for the user to easily grasp the contact relationship need not necessarily use highlighting as described in the embodiment and may be realized using any other publicly known technology in such a manner that it is made possible to distinguish a specific contact portion using morphing (representing a state of gradually changing from one shape to another as a moving image), for example.

Change display of the geometrical shapes need not necessarily be similar display as the geometrical shapes are enlarged or reduced for display.

Figure 4:
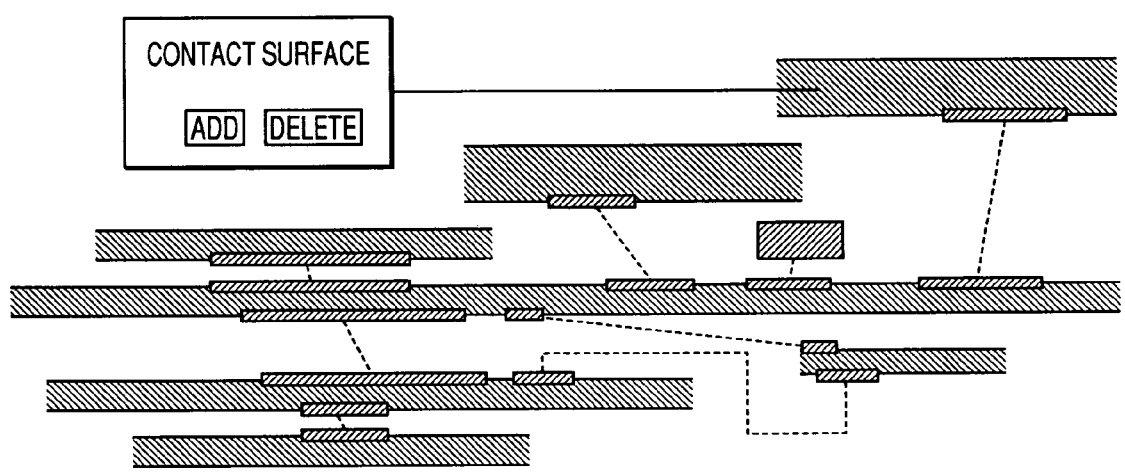
FIG. 4 is a schematic representation to show another specific example of a display screen produced by the simulation condition input apparatus according to the exemplary embodiment of the invention.

FIG. 4 is a schematic representation to show another specific example of a display screen produced by the simulation condition input apparatus. It shows the case where change is added to the geometrical shapes of the element members so that the geometrical shapes of the element members are displayed in a unified manner to the geometrical shape expanded in accordance with a predetermined rule. More specifically, change is added to the geometrical shapes so that the element members of rollers, belts, etc., are arranged as their contact surfaces are all expanded like a belt extending in the same direction. Also in such a display state, each contact portion is displayed as connection indicated by a dashed line or the portions are highlighted so as to enable the user to easily grasp the contact relationship.

Although the exemplary embodiment of the invention has been described, it is to be understood that the invention is not limited to the specific embodiment thereof and various modifications and changes may be made without departing from the spirit and the scope of the invention. For example, in the description of the embodiment, simulation analysis of thermal analysis, discharge analysis, etc., is conducted on the transport system made up of the element members of rolls, belts, etc., by way of example. However, to conduct simulation analysis requiring information about the contact state between element members on a system made up of element members, it is made possible to facilitate information input by applying the invention in a similar manner to any system other than the transport system.

What is claimed is:

1. A simulation condition input apparatus for inputting information required for simulation analysis on a system including a plurality of element members, the apparatus comprising:
   a display unit that displays the plurality of element members on a screen with geometrical shapes corresponding to the element members;
   a specifying unit that specifies a contact portion between at least one set of the element members on the screen of the display unit; and
   an input unit that displays a new window screen and inputs information about a contact state of the contact portion specified by the specifying unit.

2. The apparatus according to claim 1, wherein when the specifying unit specifies the contact portion, the display unit changes a display mode of the specified contact portion so that the specified contact portion is distinguished from other contact portions between the element members.

3. The apparatus according to claim 1, wherein the display unit corrects the geometrical shapes of the element members so that each of surface lengths or peripheral lengths of the element members in contact with each other becomes an integral multiple of a constant value.

4. The apparatus according to claim 1, wherein the information about the contact state includes at least one of a size of the contact portion, a heat resistance of the contact portion and an electric resistance of the contact portion.

5. A simulation condition input apparatus for inputting information required for simulation analysis on a system including a plurality of element members, the apparatus comprising:
   a display unit that displays the plurality of element members on a screen with geometrical shapes corresponding to the element members;
   a specifying unit that specifies a contact portion between at least one set of the element members on the screen of the display unit; and
   an input unit that displays a new window screen and inputs information about a contact state of the contact portion specified by the specifying unit, wherein:
   the display unit changes the geometrical shapes of the at least one set of the element members, of which the contact portion has been specified by the specifying unit, so as to display the at least one set of the element members separately from each other.

6. The apparatus according to claim 5, wherein the display unit changes the geometrical shapes of the element members so as to enlarge or reduce the geometrical shape of one of the element members belonging to the at least one set.

7. The apparatus according to claim 5, wherein the display unit changes the geometrical shapes of the element members so as to display the geometrical shape of one of the element members belonging to the at least one set with a geometrical shape, which is expanded in accordance with a predetermined rule.

8. A simulation analysis system comprising:
   a simulation apparatus that executes simulation analysis on a system comprising a plurality of element members; and
   a simulation condition input apparatus that inputs information required for the simulation analysis, wherein:
   the simulation condition input apparatus comprises:
      a display unit that displays the plurality of element members on a screen with geometrical shapes corresponding to the element members;
      a specifying unit that specifies a contact portion between at least one set of the element members on the screen of the display unit; and
      an input unit that displays a new window screen and inputs information about a contact state of the contact portion specified by the specifying unit.

9. A computer readable medium storing a program causing a computer to execute a process for inputting information required for simulation analysis on a system comprising a plurality of element members, the process comprising:
   displaying the plurality of element members on a screen with geometrical shapes corresponding to the element members;
   specifying a contact portion between at least one set of the element members on the screen; and
   displaying a new window screen and inputting information about a contact state of the specified contact portion, wherein
   the information is required for simulation analysis.

10. A simulation condition input method for inputting information required for simulation analysis on a system including a plurality of element members, the method comprising:
    displaying the plurality of element members on a screen with geometrical shapes corresponding to the element members;
    specifying a contact portion between at least one set of the element members, which is an information input target, on the screen; and
    displaying a new window screen and inputting information about a contact state of the specified contact portion, wherein
    the information is required for simulation analysis.

11. A simulation condition input apparatus for inputting information required for simulation analysis on a system including a plurality of element members, the apparatus comprising:
- a display unit that displays the plurality of element members on a screen with geometrical shapes corresponding to the element members;
- a specifying unit that specifies a contact portion between at least one set of the element members on the screen of the display unit; and
- an input unit that displays a new window screen and inputs information about a contact state of the contact portion specified by the specifying unit, wherein:

the display unit changes the geometrical shapes of the at least one set of the element members, of which the contact portion has been specified by the specifying unit, so as to display the at least one set of the element members separately from each other, and the display unit changes the geometrical shapes of the element members so as to display the geometrical shape of one of the element members belonging to the at least one set with a geometrical shape, which is expanded in accordance with a predetermined rule.

* * * * *